United States Patent
Christie et al.

(10) Patent No.: US 6,501,759 B1
(45) Date of Patent: Dec. 31, 2002

(54) BROADBAND TELECOMMUNICATIONS SYSTEM

(75) Inventors: Joseph Michael Christie, deceased, late of San Bruno, CA (US); by Joseph S. Christie, legal representative, Mt. Pleasant, PA (US); by Jean M. Christie, legal representative, Mt. Pleasant, PA (US); Michael Joseph Gardner, Overland Park, KS (US); Albert Daniel DuRee, Independence, MO (US); William Lyle Wiley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/498,171

(22) Filed: Feb. 4, 2000

(Under 37 CFR 1.47)

Related U.S. Application Data

(63) Continuation of application No. 08/754,849, filed on Nov. 22, 1996, now Pat. No. 6,115,380.

(51) Int. Cl.$^7$ .............................. H04L 12/56; H04J 3/16

(52) U.S. Cl. ................... 370/395.3; 370/410; 370/524; 370/466; 370/270; 379/114.05; 379/201.01; 379/230

(58) Field of Search ................................. 370/259, 260, 370/261, 351, 360, 395.2, 395.3, 396, 397, 410, 389, 384, 392, 398, 399, 400, 409, 522, 270, 524, 395.1, 466; 379/201, 219, 220, 202, 114.05, 201.01, 230

(56) References Cited

U.S. PATENT DOCUMENTS

| | | | |
|---|---|---|---|
| 4,720,850 A | 1/1988 | Oberlander et al. |
| 4,763,317 A | 8/1988 | Lehman et al. |
| 4,774,706 A | 9/1988 | Adams |
| 5,051,983 A | 9/1991 | Kammerl |
| 5,193,110 A | 3/1993 | Jones et al. |

(List continued on next page.)

FOREIGN PATENT DOCUMENTS

| | | |
|---|---|---|
| AU | 54861/90 | 1/1992 |
| EP | 0225714 A1 | 6/1987 |
| EP | 0488399 B1 | 6/1992 |
| JP | 45-38569 | 12/1970 |
| JP | 60-169318 | 9/1985 |
| RU | 94007258 | 2/1996 |
| WO | WO 95/31057 | 11/1995 |

OTHER PUBLICATIONS

ITU–T Q.722, Specifications of Signalling System No. 7, "General Function of Telephone Messages And Signals" 1993.

(List continued on next page.)

*Primary Examiner*—Seema S. Rao
(74) *Attorney, Agent, or Firm*—Harley R. Ball; Steven J. Funk; Kevin D. Robb

(57) ABSTRACT

The invention is a system for providing virtual connections through an ATM interworking multiplexer on a call-by-call basis. A signaling processor receives signaling for a call and selects the virtual connection for the call. The signaling processor generates control messages that identify the selection and transfers the control messages to the ATM interworking multiplexer that accepted the access connection for the call. The multiplexer converts user information from the access connection into ATM cells for transmission over the virtual connection in accord with the control messages.

58 Claims, 3 Drawing Sheets

U.S. PATENT DOCUMENTS

| | | | |
|---|---|---|---|
| 5,204,857 A | 4/1993 | Obara | |
| 5,218,602 A | 6/1993 | Grant et al. | |
| 5,251,255 A | 10/1993 | Epley | |
| 5,367,566 A | 11/1994 | Moe et al. | |
| 5,392,402 A | 2/1995 | Robrock, II | |
| 5,420,916 A | 5/1995 | Sekiguchi | |
| 5,434,852 A | 7/1995 | La Porta et al. | |
| 5,440,563 A | 8/1995 | Isidoro et al. | |
| 5,459,722 A | 10/1995 | Sherif | |
| 5,473,677 A | 12/1995 | D'Amato et al. | |
| 5,497,373 A | 3/1996 | Hulen et al. | |
| 5,513,355 A | 4/1996 | Doellinger et al. | |
| 5,519,707 A | 5/1996 | Subramanian et al. | |
| 5,539,884 A | 7/1996 | Robrock, II | |
| 5,550,820 A | 8/1996 | Baran | |
| 5,563,939 A | 10/1996 | La Porta et al. | |
| 5,587,999 A | 12/1996 | Endo | |
| 5,594,723 A | 1/1997 | Tibi | |
| 5,608,447 A | 3/1997 | Farry et al. | |
| 5,623,493 A | 4/1997 | Kegemoto | |
| 5,673,262 A | 9/1997 | Shimizu | |
| 5,680,390 A | 10/1997 | Robrock, II | |
| 5,710,769 A | 1/1998 | Anderson et al. | |
| 5,771,234 A | 6/1998 | Wu | |
| 5,787,086 A | 7/1998 | McClure et al. | |
| 5,793,845 A | 8/1998 | Hollywood et al. | |
| 5,835,584 A | 11/1998 | Penttonen | |
| 6,016,343 A | 1/2000 | Hogan et al. | |
| 6,031,840 A | 2/2000 | Christie et al. | |
| 6,061,364 A | 5/2000 | Hager et al. | |
| 6,072,798 A | 6/2000 | Beasley | |
| 6,115,380 A | 9/2000 | Christie | |
| 6,212,193 B1 * | 4/2001 | Christie | 370/410 |
| 6,324,179 B1 * | 11/2001 | Doshi et al. | 370/395.4 |

OTHER PUBLICATIONS

ITU–T Q1219, Intelligent Network, "Intelligent Network User's Guide For Capability Set 1," Apr. 1994.

Bauer, Helen A., Kulzner, John J., Sable, Edward G., "Designing Service–Independent Capabilities for Intelligent Networks," IEEE Dec. 1998.

Thorner, Intelligent Networks, Chapter 2, 2.1 New Trends and Network Economy are the Driving Forces Behind Intelligent Networks, Artech House, 1994.

David Giddy et al., "An Experimental ATM Network Fraturing De–Coupled Modular Control," Telecom Australia Research Laboratories (Victoria), p. 118–122, (Nov., 1992).

The ATM Forum Technical Committee, "Voice and Telephony Over ATM to the Desktop Specification," AF–V-TOA–0083.001, The ATM Forum (Mountain View, CA), p. 1–50, (Feb., 1999).

Thomas F. La Porta, "Distributed Call Processing for Wireless Mobile Networks," Bell Labs Technical Journal, vol. 1 (No. 1), p. 127–142, (Oct., 1996).

Surinder K. Jain, "Evolving Existing Narrowband Networks Towards Broadband Networks with IN Capabilities," IEEE, (Jan., 1996).

V. Carmagnola, "An Intergrated IN/B–ISDN Reference Architecture for the support of Multimedia Services," IEEE, (Jan., 1996).

Yukio Kawanami, "IN Platform for DAVIC Video On Demand Service," IEEE, (Jan., 1996).

George E. Fry et al., "Next Generation Wireless Networks," Bell Labs Technical Journal, vol. 1 (No. 1), p. 88–96, (1996).

Bengt Svantesson Ahmed Hermani, "A Novel Allocation Strategy for Control and Memory Intensive Telecommunication Circuits," IEEE, p. 23–28, (Jan., 1996).

Principles of Intelligent Network Architecture, I.312/Q.1201 Integrated Services Digital Network(ISDN) I.312, CCITT (Oct., 1992).

Broadband Aspects of ISDN, I.121 Integrated Services Digital Network (IDSN) CCITT (1991).

Framework for Recommendations For Audiovisual Services, H.200 Line Transmission of Non–Telephone Signals ITU–T (Mar. 1993).

B–ISDN general network aspects, I.311 Series I: Integrated Services Digital Network ITU–T (Aug., 1996).

ITU–T, "Visual Telephone Systems and Equipment for Local Area Networks Which Provide A Non–Guaranteed Quality of Service," ITU–T Recommendation, (May 28, 1996).*

Bjoern Christensen, "Tutorial: Integration of Fixed and Mobile Networks," IEEE Siemens AG, IEEE, (Feb. 2, 1996).*

Bjoern E. Christensen, Tutorial: Integration of Fixed and Mobile Networks, IEEE, 1996 p. 1–19, Melbourne.

Barry T. Dingle, ISDN Signalling Control Part (ISCP), Autralian Broadband Switching and Services Symposium, 1992, pp. 333–340, vol. 2 Melbourne.

Rob Plamer, An Experimental ATM Network for B–ISDN Research, IEEE Region 10 Conference 1992, Melbourne.

ITU–T, Line Transmission of Non–Telephone Signals "Visual Telephone Systems and Equipment for Local Area Networks Which Provide a Non–Guaranteed Quality of Service" H.323 May 28, 1996, pp. 1–75.

S. L. Sutherland, Broadband ISDN Interworking, Australian Broadband Switching and Services Symposium, Jul. 1992, pp. 405–412 vol. 2, Melbourne.

William Stallings, Ph.D., "Data and Computer Communications" Prentice Hall, Fourth Edition 1994, pp. 258–261, Upper Saddle River, New Jersey.

D. J. Houck, "Failure and Congestion Propagation through Signaling Controls" Proceedings of the $14^{th}$ International Teletraffice Congress, AT&T Bell Laboratories, pp. 367–376, Holmdel, New Jersey.

William Stallings, "ISDN and Broadband ISDN" Macmillan Publishing company, Second Edition, New York, pp. 433–485.

Bernhard Petri, "Narrowband ISDN and Broadband ISDN Service and Network Interworking" IEEE Communications Magazine, Jun. 1996, pp. 84–89.

Raif O. Onvural, "Asynchronous Transfer Networks" Performance Issue, Second Edition, 1995, Artech House, Norwood, MA 02062.

* cited by examiner

BROADBAND TELECOMMUNICATIONS SYSTEM

RELATED APPLICATIONS

This application is a continuation of prior application Ser. No. 08/754,849, entitled "BROADBAND TELECOMMUNICATIONS SYSTEM" filed Nov. 22, 1996, now U.S. Pat. No. 6,115,380 and incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to broadband systems, and in particular, to broadband systems that utilize narrowband circuit switches for various call capabilities.

2. Background of the Prior Art

Conventional circuit switches provide the backbone for many current telecommunications networks. These switches process call signaling and extend the call connection towards the destination. They have also been developed to include sophisticated capabilities. Examples include caller validation, number screening, routing, connection control, and billing. These switches are also used to deploy various services. Examples include calling cards, "800" calling, voice messaging, and class services.

At present, Asynchronous Transfer Mode (ATM) technology is being developed to provide broadband switching capability for telecommunications calls, which are requests for telecommunications services. Some ATM systems have used ATM cross-connects to provide virtual connections, but cross-connect devices do not have the capacity to process signaling used by telecommunications networks to set-up and tear down calls. Thus, ATM cross-connects cannot make connections on a call-by-call basis. As a result, connections through cross-connect systems must be pre-provisioned which creates a relatively rigid switching fabric. Due to this limitation, ATM cross-connect systems have been used primarily to provide dedicated connections, such as permanent virtual circuits (PVCs) and permanent virtual paths (PVPs). But, they do not provide ATM switching on a call by call basis as required to provide switched virtual circuits (SVCs) or switched virtual paths (SVPs). Those skilled in the art are well aware of the efficiencies created by using SVPs and SVCs as opposed to PVCs and PVPs because SVCs and SVPs utilize bandwidth more efficiently.

ATM switches have also been used to provide PVCs and PVPs. Because PVCs and PVPs are not established on a call-by-call basis, the ATM switch does not need to use its call processing or signaling capacity. ATM switches require both signaling capability and call processing capability to provide SVCs and SVPs. In order to achieve virtual connection switching on a call by call basis, ATM switches are being developed that can process calls in response to signaling to provide virtual connections for each call. These systems cause problems, however, because they must be very sophisticated to support current networks. These ATM switches must process high volumes of calls and transition legacy services from existing networks. An example would be an ATM switch that can handle large numbers of POTS, 800, and VPN calls.

Currently, ATM multiplexers are capable of interworking traffic of other formats into the ATM format. These are known as ATM interworking multiplexers (muxes). ATM multiplexers are being developed that can interwork traffic into ATM cells and multiplex the cells for transport over an ATM network. These ATM mux are not used to implement virtual connections selected on a call-by-call basis.

Unfortunately, there is a need for efficient systems that can integrate the capabilities of broadband components with the capabilities of conventional circuit switches. Such a system would provide ATM virtual connections on a call-by-call basis, but support the numerous services currently provided by circuit switches.

SUMMARY

The present invention includes a telecommunications system and method for providing a service for a call. The invention operates as follows. A signaling processor receives and processes a first telecommunications signaling message for the call to provide a first control message, a second control message, and a second telecommunications signaling message. A first ATM interworking multiplexer receives narrowband traffic for the call over a first narrowband connection. It converts the narrowband traffic from the first narrowband connection into ATM cells that identify a first virtual connection based on the first control message and transmits the ATM cells over the first virtual connection. An ATM cross-connect system receives the ATM cells from the first ATM interworking multiplexer over the first virtual connection and routes the ATM cells from the first virtual connection based on the first virtual connection identified in the ATM cells. A second ATM interworking multiplexer receives the ATM cells from the ATM cross-connect system over the first virtual connection. It converts the ATM cells from the first virtual connection into the narrowband traffic and transmits the narrowband traffic over a second narrowband connection based on the second control message. A narrowband switch receives the narrowband traffic from the second ATM multiplexer over the second narrowband connection and provides a service to the call based on the second telecommunications signaling message. In various embodiments, the service provided by the narrowband switch is: routing the call, billing the call, validating the call, a calling card service, or a voice messaging service.

In various embodiments, the signaling processor selects the narrowband switch. The selection can be based on: available access to the narrowband switch, loading on the narrowband switch, an area served by the narrowband switch, network maintenance conditions, or the first telecommunications signaling message (including a destination point code, an origination point code, an NPA, an NPA-NXX, a caller's number, an "800","888", or "900" number, or a network identifier in the message).

In various embodiments, the signaling processor selects the first virtual connection based on: the selected narrowband switch, available access to the narrowband switch, loading on the narrowband switch, an area served by the narrowband switch, network maintenance conditions, or the first telecommunications signaling message (including a destination point code, an origination point code, an NPA, an NPA-NXX, a caller's number, an "800", "888", or "900" number, or a network identifier in the message).

In various embodiments, the narrowband switch processes the call based on the second telecommunications signaling message. It provide a third telecommunications signaling message based on the call processing and routes the narrowband traffic for the call to the second ATM multiplexer over a third narrowband connection. The signaling processor receives and processes the third telecommunications signaling message to provide a third control message to the second ATM multiplexer, and to provide a fourth control message. The second ATM interworking multiplexer receives the narrowband traffic for the call from the narrowband switch over the third narrowband connection. It converts the narrowband traffic from the third narrowband connection into ATM cells that identify a second virtual connection based on the third control message and transmits the ATM cells over the second narrowband connection. The ATM cross-connect system receives the ATM cells from the second ATM interworking multiplexer over the second virtual connection and routes the ATM cells from the second virtual connection based on the second virtual connection identified in the ATM cells. A third ATM interworking multiplexer receives the ATM cells from the ATM cross-connect system over the second virtual connection. It converts the ATM cells from the second virtual connection into the narrowvband traffic and transmits the narrowband traffic over a fourth narrowband connection based on the fourth control message. In various of these embodiments, the signaling processor selects the second virtual connection based on a destination point code in the third telecommunications signaling message or based on a destination network identified in the third telecommunications signaling message.

DETAILED DESCRIPTION

Figure 1:
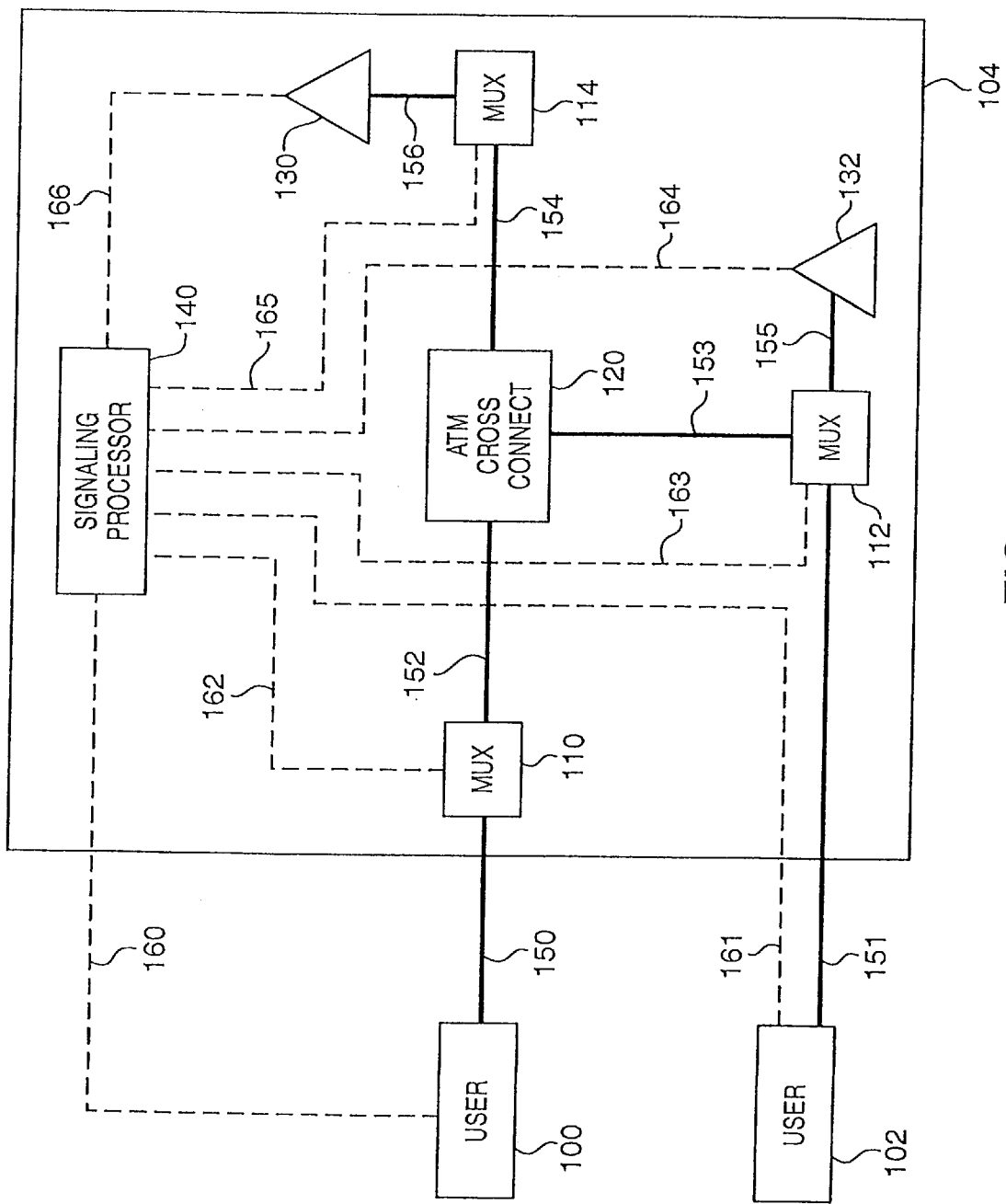
FIG. 1 is a block diagram for a version of the invention.

FIG. 1 depicts a version of the invention. The term "connection" refers to the transmission media used to carry user traffic and the term "link" refers to the transmission media used to carry signaling or control messages. On FIG. 1, connections are shown by solid lines and links are shown by dashed lines. Users 100 and 102 are connected to broadband system 104 by connections 150 and 151 respectively. Users 100 and 102 are linked to broadband system 104 by links 160 and 161 respectively. Users 100 and 102 could be any entity that supplies telecommunications traffic to broadband system 104 or that receives traffic from broadband system 104. Some examples would be a telecommunications switch or customer premises equipment (CPE). Connections 150 and 151 represent any connection that might be used by users 100 and 102 to access broadband system 104. Examples include: DS3, DS1, DS0, ISDN, E3, E1, E0, SDH, SONET, cellular, and PCS connections. Links 160 and 161 represent any signaling link that might be used between users 100 and 102 and broadband system 104. Examples include signaling system #7 (SS7), C7, ISDN, TCP/IP, and UDP/IP.

Broadband system 104 includes ATM interworking multiplexer (mux) 110, mux 112, mux 114, ATM cross-connect 120, narrowband switches 130 and 132, and signaling processor 140. Broadband system 104 also includes connections 152–156 and links 162–166. Cross-connect 120 is connected to mux 110, 112, and 114 by connections 152, 153, and 154 respectively. Mux 112 is connected to switch 132 by connection 155, and mux 114 is connected to switch 130 by connection 156. Mux 112 is connected to user 100 by connection 150, and mux 112 is connected to user 102 by connection 151. Connections 152–154 are ATM connections—preferably carried by SONET. Connections 155 and 156 are narrowband connections similar to connections 150 and 151. Preferably, connections 155 and 156 are DS3 or DS1 connections with embedded DS0s.

Signaling processor 140 is linked to mux 110 by link 162, to mux 112 by link 163, to switch 132 by link 164, to mux 114 by link 165, and to switch 130 by link 166. Signaling processor is linked to users 100 and 102 by links 160 and 161 respectively. One skilled in the art is aware that an STP might be used to exchange signaling instead of direct links. Links 160, 161, 164, and 166 are conventional signaling links with examples being SS7, ISDN, or C7. Links 162, 163, and 165 are any links that carry control messages, with examples being SS7 links, UDP/IP over ethernet, or a bus arrangement using a conventional bus protocol. Typically the switches and muxes are connected to a network management system that is not shown for purposes of clarity.

ATM cross-connect 120 is a conventional device that provides a plurality of ATM virtual connections between the muxes. Typically, the virtual connection would use DS1, DS3, or SONET for transport. The virtual connections are typically designated by the Virtual Path Identifier/Virtual Channel Identifier (VPI/VCI) in the cell headers. These VPI/VCIs are provisioned from mux to mux, but the cross-connect does not need to be controlled on a call-by-call basis. An example of the cross-connect is the NEC model 20. Those skilled in the art are aware that a multiple cross-connects could be used in this fashion, but for purposes of clarity, only a single cross-connect is shown. Either a single cross-connect or multiple cross-connects are referred to as a cross-connect system.

Muxes 110, 112, and 114 are operational to interwork (convert) traffic between ATM and non-ATM formats in response to control messages from signaling processor 140. Typically, this interworking entails interworking individual DS0s with individual VPI/VCIs in accord with messages from by signaling processor 140. A detailed description of the muxes is provided further below.

Narrowband switches 130 and 132 are conventional circuit switches. These switches process and interconnect calls. Typically, they connect an incoming DS0 to an outgoing DS0. Often, they perform numerous tasks including, validation, screening, routing, billing, and echo control. These switches can also be configured to provide special services. Examples of special services are: calling cards, class services, voice activated calling, and voice messaging, virtual private networking, hearing impaired assistance/ enhancement, operator services and intelligent network call routing (local number portability, personal/terminal mobility, toll free calling)

Signaling processor 140 is operational to receive and process signaling to select a narrowband switch and connections to the selected switch. This switch selection can be based on various criteria. A few examples are: available access to the switch, current loading on the switch, the service capabilities of the switch, or the area served by the switch. Typically, the connections would be a VPI/VCI and a DS0. Signaling processor 140 is capable of providing control messages to the muxes to implement the connections. Signaling processor 140 is also capable of exchanging signaling with the switches to facilitate call processing. If required signaling processor 140 can also exchange signaling with the users to facilitate the call. A detailed description of signaling processor 140 follows further below.

In one embodiment, the invention operates as follows for a call from user 100 to user 102. In this embodiment, signaling processor 140 is transparent to the users and to the narrowband switches. The users and narrowband switches attempt to interact as they would in a typical network scenario. In the context of the invention, signaling is "intercepted" and processed by signaling processor 140. Connections are "intercepted" and extended by the muxes.

User 100 will seize a call connection on connection 150 to mux 110. Typically, this is a DS0 embedded within a DS3. User 100 will also forward a call set-up message to signaling processor 140. Typically, this is an SS7 Initial Address Message (IAM). Signaling processor 140 will process the IAM in order to select a switch to process the call, it will select the connections to that switch. For example, if switch 130 is selected, an ATM connection pre-provisioned through cross-connect 154 from mux 110 to mux 114 over connections 152 and 154 would be selected. In addition, a connection to switch 130 would be selected within connection 156. For a standard call, a VPI/VCI and a DS0 would be selected by signaling processor 140.

Signaling processor 140 would send an IAM to switch 130 over link 166. The IAM would contain information used to process the call, such as the dialed number and the incoming DS0. Signaling processor would send a control message to mux 110 over link 162. The control message would instruct mux 110 to interwork the DS0 on connection 150 with the selected VPI/VCI on connection 152. Signaling processor would send a control message to mux 114 over link 165. The control message would instruct mux 114 to interwork the selected VPI/VCI on connection 154 with the selected DS0 on connection 156. As a result, a call path from user 100 to switch 130 would be established through mux 110, cross-connect 120, and mux 114.

Switch 130 would process the call and select a route for the call. The switch would interconnect the incoming DS0 on connection 156 with another DS0 on connection 156. Switch 130 would also send an IAM indicating the destination for the call. In this example, the destination selected by switch 130 would be user 102. The IAM from switch 130 would be routed to signaling processor 140. Signaling processor 140 could read the destination point code in this IAM to determine the destination (user 102) selected by the switch for the call. Signaling processor 140 would select a VPI/VCI from mux 114 to the mux serving the destination—mux 112. Signaling processor 140 would also select a DS0 within connection 151 between mux 112 and user 102.

Signaling processor 140 would send a control message to mux 114 over link 165. The control message would instruct mux 114 to interwork the DS0 on connection 156 with the selected VPI/VCI on connection 154. Signaling processor 140 would send a control message to mux 112 over link 163. The control message would instruct mux 112 to interwork the selected VPI/VCI on connection 153 with the selected DS0 on connection 151. Signaling processor 140 might send a signaling message to user 102 to facilitate call completion.

As a result, a call path from switch 130 to user 102 would be established through mux 114, cross-connect 120, and mux 112. Combining the two call paths, a connection from user 100 to user 102 is established through broadband system 104. Advantageously, this is accomplished over broadband ATM connections, but without the need for an ATM switch or the call-by-call control of the ATM cross-connect. The muxes and the cross-connect provide ATM connections selected by the signaling processor on a call-by-call basis. The signaling processor makes these selections based on the call processing of the narrowband switch. The narrowband switch is also able to provide special features to the call.

Advantageously, only one narrowband switch was required within system 104. Because ATM broadband transport is available, the location of this switch is relatively independent. Any switch in system 104 could be used to process call. The ATM system provides the connection from the origination point to the switch, and from the switch to the destination point. This means narrowband switches can be selected based on load and availability. A narrowband switch could also be taken out of service simply by instructing the signaling processor to quit selecting it.

THE SIGNALING PROCESSOR

The signaling processor would typically be separate from the muxes, but those skilled in the art appreciate that they could be housed together and coupled in a bus arrangement instead of being coupled by a data or signaling link. The signaling processor may support a single mux or a plurality of muxes. The signaling processor is comprised of hardware and software. Those skilled in the art are aware of various hardware components which can support the requirements of the invention. One example of such hardware is the FT-Sparc provided by Integrated Micro Products PLC. The FT-Sparc could use the Solaris operating system. Any data storage requirements could be met with conventional database software systems.

Figure 2:
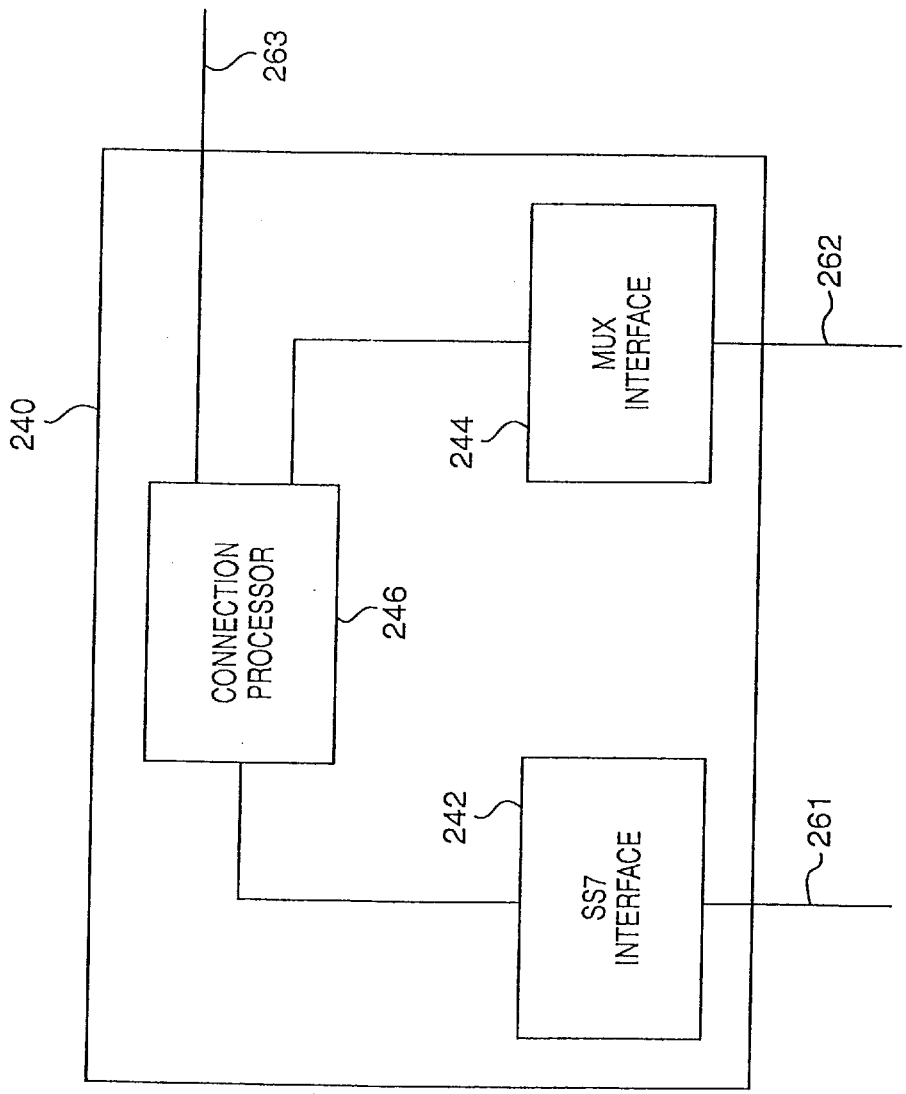
FIG. 2 is a logic diagram for a version of the invention.

FIG. 2 illustrates an example of the signaling processor, but any processor which supports, the requirements stated for the invention would suffice. As shown in FIG. 2, signaling processor 240 includes functional blocks composed of SS7 interface 242, mux interface 244, and connection processor 246. These functional blocks have interrelations that are indicated and that are discussed below. SS7 interface 242 receives and transmits SS7 signaling over link 261. Mux interface 244 exchanges control messages with the muxes over link 263. Connection processor 246 exchanges network management information with network management systems over link 263.

SS7 interface 242 is operational to receive and transmit SS7 messages. SS7 interface 242 includes Message Transfer Part (MTP) functionality for MTP levels 1, 2 and 3. MTP 1 defines the physical and electrical requirements for a signaling link. MTP 2 sits on top of MTP 1 and maintains reliable transport over a signaling link by monitoring status and performing error checks. Together, MTP 1–2 provide reliable transport over an individual link. A device would need MTP 1–2 functionality for each link it uses. MTP 3 sits on top of MTP 2 and provides messages to the proper signaling link (actually to the MTP 2 for that link). MTP 3 directs messages to applications using MTP 1–2 for access to the signaling system. MTP 3 also has a management function which monitors the status of the signaling system and can take appropriate measures to restore service through the system. MTP levels 1–3 correspond to layers 1–3 of the open systems interconnection basic reference model (OSIBRF).

SS7 interface 242 also includes Integrated Services Digital Network User Part (ISUP) functionality. This might include ISUP timers that generate release message or re-transmit message where appropriate. If B-ISUP signaling is being used, SS7 interface 242 could also be equipped with B-ISUP capability. All of these elements are known in the art. SS7 interface 242 could be constructed using commercially available SS7 software interface tools. An example of such tools would be SS7 interface software provided by either Trillium, Inc., or by Dale, Gesek, McWilliams, and Sheridan, Inc.

SS7 interface 242 forwards IAM messages from link 261 to connection processor 246. SS7 interface 242 also receives IAMs from connection processor 246 and transmits them over link 261. SS7 interface 242 will receive subsequent SS7 call-related messages from link 261. SS7 interface 242 will alter the routing labels of these subsequent messages and re-transmit them over link 261. Examples of these subsequent messages include Address Complete Messages (ACM), Answer Messages (ANM), Release Messages (REL), and Release Complete Messages (RLC).

The routing label contains a Destination Point Code (DPC), an Originating Point Code (OPC), a Circuit Identification Code (CIC), and a Signaling Link Selection (SLS) code. The OPC and DPC identify the origin and intended destination for the signaling message. For example, a message sent from point A to point B would have an OPC of A and a DPC of B. A return message would reverse the two and have an OPC of B and DPC of A. The CIC identifies the originating circuit used on the call. The SLS is used to allow load sharing among the signaling links.

The following discussion refers to FIG. 1 and its associated embodiment. When subsequent call related messages are received by the SS7 interface of signaling processor 140, the OPC, DPC, and/or CIC may need to be altered. A message from originating user 100 to selected switch 130 would have its DPC and CIC altered to reflect the new DPC and CIC selected for the call by signaling processor 140. This is because switch 130 expects its own DPC and switch 130 also needs to know the actual DS0 used by mux 114 on connection 156. A message to originating user 100 from switch 130 would have its OPC altered to reflect the DPC in the original IAM from user 100. This is because user 100 expects response messages for the call from the point where the original IAM was sent. This point code is the DPC of the original IAM. The CIC is also altered to reflect the CIC in the original IAM from user 100. This is because user 100 expects the DS0 in the message to be the DS0 used in connection 150. Messages between terminating user 102 and selected switch 130 would need the CICs altered to reflect the actual DS0 used by the recipient of the message. The CIC in messages from user 102 to switch 130 would reflect the DS0 in connection 156. The CIC in messages from switch 130 to user 102 would reflect the DS0 in connection 151.

Referring back to FIG. 2, connection processor 246 is operational to process incoming IAMs and select connections. On calls into the network, connection processor 246 selects a narrowband switch to process the call and also selects the connections to this narrowband switch. These connections are typically VPI/VCI—DS0 combinations. If the call is extended beyond the selected narrowband switch, connection processor 246 identifies the required call destination in the IAM from the narrowband switch. Connection processor 246 also selects the connections to this destination. These connections are typically VPI/VCI—DS0 combinations.

As discussed above, the signaling processor can be transparent to the users. As a result, the users will send signaling to the narrowband switch selected by the user. The destination of this SS7 signaling message is identified by the Destination Point Code (DPC). Thus, on calls entering the network, the DPC indicates a narrowband switch selected by the user. Connection processor 246 typically uses this DPC to select a narrowband switch. This may be the same narrowband switch selected by the user or another narrowband switch. Connection processor 246 may then check the current usage of the selected switch. This might include the available trunk access to the switch and/or the processing load of the switch. If the access to the switch is congested or if the switch CPU is heavily loaded, then an alternate switch may be selected. In addition, special network operations may require the use of an alternate switch—for example, if a switch is inactive for maintenance or testing.

Once the switch is selected, connections to the switch are selected. The DS0 in the inbound connection is identified by the Circuit identification Code (CIC) in the IAM. A VPI/VCI is selected that has been previously provisioned through the cross-connect from the mux connected to the incoming DS0 to the mux serving the selected switch. A DS0 is selected from the latter mux to the selected switch. Based on the selections, IAM information is provided to SS7 interface 242, and control message information is provided to mux interface 244.

As discussed above, once the narrowband switch processes the call, it will send an IAM to the destination. Connection processor 246 will receive this IAM and use the DPC to identify the destination and select the appropriate connections to this destination. The CIC in the IAM identifies the DS0 from the selected switch to the mux. A VPI/VCI from that mux to a destination mux and a DS0 from the destination mux to the destination are selected. The selections are then implemented by the muxes in response to control messages from signaling processor 240. Connection processor 246 also tracks the usage and status of connections and connection groups for the connections under its span of control. It also receives network management information.

In some embodiments, connection processor 246 uses at least portions of the dialed number to select the narrowband switch. For example, narrowband switch "A" might be assigned to area code "X". On calls to area code "X", switch "A" is selected. If switch "A" is unavailable, alternate switch "B" could be used. This could also be carried out using the area code and exchange (NPA-NXX). In some embodiments, the dialed number may correspond to a special service offered by a select group of switches. For example, the number "1-800-NXX-XXX" might correspond to a calling card service offered from only two switches. "888" and "900" numbers are also used in this fashion. Connection processor 246 could select one of these switches based on the dialed number. In some embodiments, the caller's number (commonly referred to as ANI), may be used in a similar fashion in order to select the switch to provide services to a caller. In some embodiments, the call could be routed to a switch based on the carrier identified in the signaling. This information is found in the carrier identification parameter in the IAM.

Mux interface 244 accepts information from connection processor 246 indicating the connections that are to be made or disconnected. Mux interface 244 accepts this information and provides corresponding control messages to the appropriate muxes. Mux interface 244 may also receive acknowledgments from the muxes. As a result, signaling processor 240 can provide ATM header information to the muxes for use in configuring the headers of ATM cells so that the cells are routed to the desired destination.

ATM INTERWORKING MULTIPLEXERS

Figure 3:
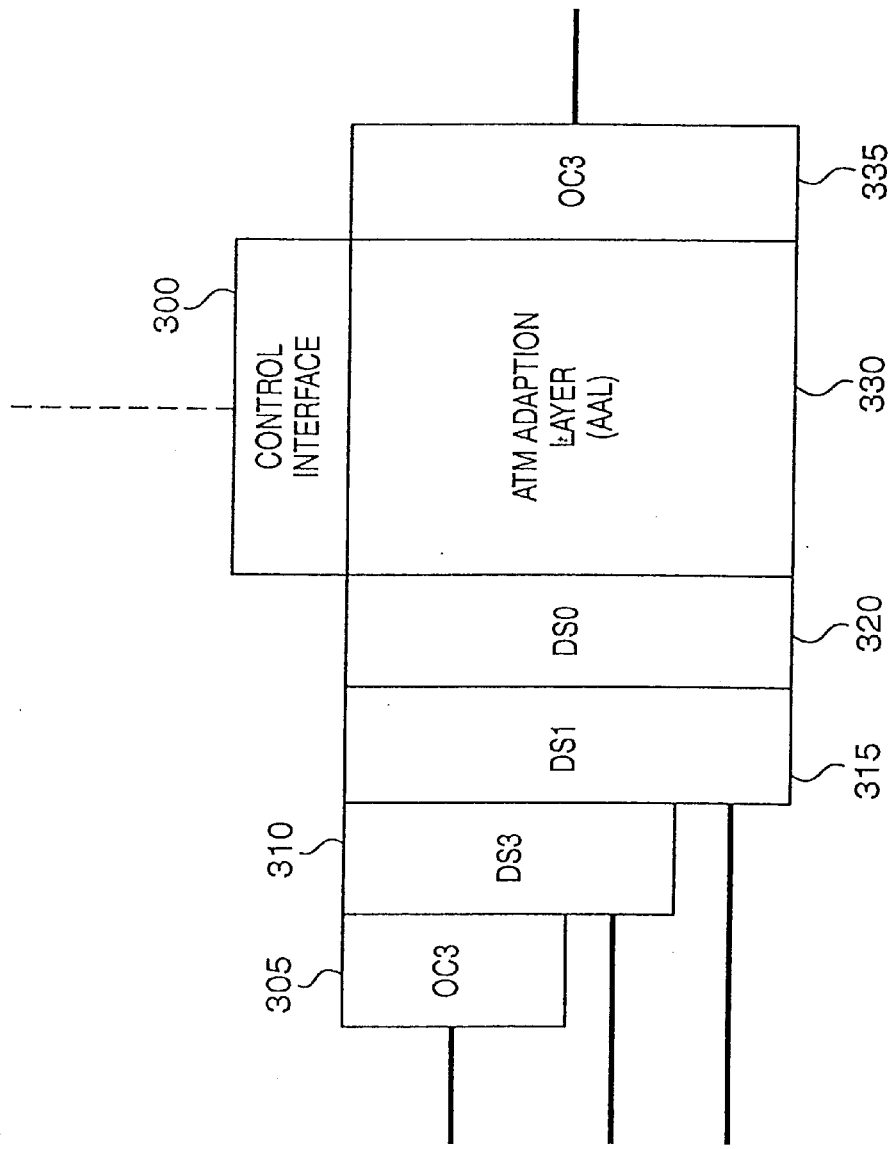
FIG. 3 is a block diagram for a version of the invention.

FIG. 3 shows one embodiment of the mux that is suitable for the present invention, but other muxes that support the requirements of the invention are also applicable. Shown are control interface 300, OC-3 interface 305, DS3 interface 310, DS1 interface 315, DS0 interface 320, ATM adaption Layer (AAL) 330, and OC-3 interface 335. Control interface 300 exchanges control messages with the signaling processor. Typically, these messages include DS0—VPI/VCI interworking assignments that are to be implemented by AAL 330. As such, this information is provided to AAL 330.

OC-3 interface 305 accepts the OC-3 format and makes the conversion to DS3. DS3 interface 310 accepts the DS3 format and makes the conversion to DS1. DS3 interface 310 can accept DS3s from OC-3 interface 305 or from an external connection. DS1 interface 315 accepts the DS1 format and makes the conversion to DS0. DS1 interface 315 can accept DS1s from DS3 interface 310 or from an external connection. DS0 interface 320 accepts the DS0 format and provides an interface to AAL 330. OC-3 interface 335 is operational to accept ATM cells from AAL 330 and transmit them to the cross-connect.

AAL 330 comprises both a convergence sublayer and a segmentation and reassembly (SAR) layer. AAL 330 is operational to accept the user information in DS0 format from DS0 interface 320 and convert the information into ATM cells. AALs are known in the art and information about AALs is provided by International Telecommunications Union (ITU) document I.363. An AAL for voice is also described in patent application Ser. No. 08/395,745, filed on Feb. 28, 1995, entitled "Cell Processing for Voice Transmission",and hereby incorporated by reference into this application. AAL 330 obtains the virtual path identifier (VPI) and virtual channel identifier (VCI) for each call from control interface 300. AAL 330 also obtains the identity of the DS0 for each call (or the DS0s for an Nx64 call). AAL 330 then converts user information between the identified DS0 and the identified ATM virtual connection. Acknowledgments that the assignments have been implemented may be sent back to the signaling processor if desired. Calls with a bit rate that are a multiple of 64 kbit/second are known as Nx64 calls. If desired, AAL 330 can be capable of accepting control messages through control interface 300 for Nx64 calls.

As discussed above, the mux also handles calls in the opposite direction—from OC-3 interface 335 to DS0 interface 320. This traffic would have been converted to ATM by another mux and routed to OC-3 335 by the cross-connect over the selected VPI/VCI. Control interface 300 will provide AAL 330 with the assignment of the selected VPI/VCI to the selected outbound DS0. The mux will convert the ATM cells with the selected VPI/VCI in the cell headers into the DS0 format and provide it to the selected outbound DS0 connection. A technique for processing VPI/VCIs is disclosed in patent application Ser. No. 08/653,852, filed on May 28, 1996, entitled "Telecommunications System with a Connection Processing System", and hereby incorporated by reference into this application.

DS0 connections are bi-directional and ATM connections are typically uni-directional. As a result, two virtual connections in opposing directions will typically be required for each DS0. As discussed, this can be accomplished provisioning the cross-connect with companion VPI/VCIs in the opposite direction as the original VPI/VCIs. On each call, the muxes would be configured to automatically invoke the particular companion VPI/VCI to provide a bi-directional virtual connection to match the bi-directional DS0 on the call.

With an understanding of the preferred embodiment, those skilled in the art will appreciate that the present invention allows the integration of high speed broadband transport with systems configured for narrowband process and control. By performing call handling functions in narrowband switches, the broadband transport capability is transparent to the users and to other existing network components configured to interact with narrowband switches. Moreover, the broadband transport is accomplished economically and efficiently without the need for broadband switches.

Those skilled in the art will appreciate that variations from the specific embodiments disclosed above are contemplated by the invention. The invention should not be restricted to the above embodiments, but should be measured by the following claims.

We claim:

1. A communication method for a call having a first message and call communications, the method comprising:

receiving and processing the first message in a processing system to select a first identifier and generating and transferring from the processing system a second message identifying the first identifier;

receiving the call communications and the second message into an asynchronous communication system, and in response to the second message, inserting the first identifier in the call communications and routing the call communications through the asynchronous communication system to a narrowband switch;

receiving the call communications in the narrowband switch and providing a service for the call wherein providing the service comprises selecting a route for the call, generating and transferring from the narrowband switch a third message identifying the route, and transferring the call communications from the narrowband switch;

receiving and processing the third message in the processing system to select a second identifier based on the route and generating and transferring from the processing system a fourth message identifying the second identifier;

receiving the call communications and the fourth message into the asynchronous communication system, and in response to the fourth message; and inserting the second identifier in the call communications and routing the call communications through the asynchronous communication system.

2. The method of claim 1 wherein receiving and processing the first message comprises receiving and processing an initial address message.

3. The method of claim 1 wherein processing the first message to select the first identifier comprises accessing a service control point.

4. The method of claim 1 wherein processing the first message to select the first identifier comprises processing a destination point code from the first message.

5. The method of claim 1 wherein processing the first message to select the first identifier comprises processing an origination point code from the first message.

6. The method of claim 1 wherein processing the first message to select the first identifier comprises processing an NPA from the first message.

7. The method of claim 1 wherein processing the first message to select the first identifier comprises processing an NPA-NXX from the first message.

8. The method of claim 1 wherein processing the first message to select the first identifier comprises processing a called number from the first message.

9. The method of claim 1 wherein processing the first message to select the first identifier comprises processing a caller number from the first message.

10. The method of claim 1 wherein processing the first message to select the first identifier comprises processing a toll-free number from the first message.

11. The method of claim 1 wherein processing the first message to select the first identifier comprises processing a network identification from the first message.

12. The method of claim 1 wherein processing the first message to select the first identifier comprises processing the first message to select the narrowband switch and selecting the first identifier based on the narrowband switch.

13. The method of claim 12 wherein selecting the narrowband switch comprises selecting the narrowband switch based on a load of the narrowband switch.

14. The method of claim 12 wherein selecting the narrowband switch comprises selecting the narrowband switch based on network access to the narrowband switch.

15. The method of claim 12 wherein selecting the narrowband switch comprises selecting the narrowband switch based on a service area for the narrowband switch.

16. The method of claim 12 wherein selecting the narrowband switch comprises selecting the narrowband switch based on a network maintenance condition.

17. The method of claim 1 wherein providing a service for the call comprises translating a called number.

18. The method of claim 1 wherein providing a service for the call comprises billing the call.

19. The method of claim 1 wherein providing a service for the call comprises validating the call.

20. The method of claim 1 wherein providing a service for the call comprises providing a calling card service for the call.

21. The method of claim 1 wherein providing a service for the call comprises providing a voice message service for the call.

22. The method of claim 1 wherein the asynchronous communication system comprises an asynchronous transfer mode system and the first identifier comprises an asynchronous transfer mode connection.

23. The method of claim 1 wherein the processing system is external to telecommunication switches.

24. The method of claim 1 further comprising:
processing the first message in the processing system to select a first connection and generating and transferring from the processing system third and fourth messages identifying the first connection;
receiving the third message into the asynchronous communication system, and in response to the third message, routing the call communications from the asynchronous communication system to the narrowband switch over the first connection; and
receiving the call communications from the first connection and the fourth message in the narrowband switch and processing the fourth message in the narrowband switch to provide the service for the call.

25. The method of claim 24 wherein providing the service for the call comprises selecting a route for the call and transferring the call communications from the narrowband switch over a second connection and generating and transferring from the narrowband switch a fifth message identifying the route and the second connection.

26. The method of claim 25 further comprising:
receiving and processing the fifth message in the processing system to select a second identifier based on the route and generating and transferring from the processing system a sixth message identifying the second identifier and the second connection; and
receiving the call communications from the second connection and the sixth message into the asynchronous communication system, and in response to the sixth message, inserting the second identifier in the call communications and routing the call communications through the asynchronous communication system.

27. The method of claim 26 further comprising:
processing the sixth message in the processing system to select a third connection and generating and transferring from the processing system a seventh message identifying the third connection;
receiving the seventh message into the asynchronous communication system, and in response to the seventh message, routing the call communications from the asynchronous communication system over the third connection.

28. The method of claim 27 further comprising converting the call communications from a synchronous format to an asynchronous format in response to the sixth message and converting the call communications from the asynchronous format to the synchronous format in response to the seventh message.

29. The method of claim 24 further comprising converting the call communications from a synchronous format to an asynchronous format in response to the second message and converting the call communications from the asynchronous format to the synchronous format in response to the third message.

30. A communication system for a call having a first message and call communications, the computer system comprising:
a processing system configured to receive and process the first message to select a first identifier, generate and transfer a second message identifying the first identifier, receive and process a third message to select a second identifier based on a route, and generate and transfer a fourth message identifying the second identifier;
an asynchronous communication system configured to receive the call communications and the second message, in response to the second message, insert the first identifier in the call communications and route the call communications, receive the call communications and the fourth message, and in response to the fourth message, insert the second identifier in the call communications, and route the call communications; and
a narrowband switch configured to receive the call communications from the asynchronous communication system, provide a service for the call, select the route for the call, generate and transfer the third message identifying the route, and transfer the call communications.

31. The communication system of claim 30 wherein the processing system is configured to process a destination point code from the first message to select the first identifier.

32. The communication system of claim 30 wherein the processing system is configured to process an origination point code from the first message to select the first identifier.

33. The communication system of claim 30 wherein the processing system is configured to process an NPA from the first message to select the first identifier.

34. The communication system of claim 30 wherein the processing system is configured to process an NPA-NXX from the first message to select the first identifier.

35. The communication system of claim 30 wherein the processing system is configured to process a called number from the first message to select the first identifier.

36. The communication system of claim 30 wherein the processing system is configured to process a caller number from the first message to select the first identifier.

37. The communication system of claim 30 wherein the processing system is configured to process a toll-free number from the first message to select the first identifier.

38. The communication system of claim 30 wherein the processing system is configured to process a network identifier from the first message to select the first identifier.

39. The communication system of claim 30 wherein the processing system is configured to process the first message to select the narrowband switch and to select the first identifier based on the narrowband switch.

40. The communication system of claim 39 wherein the processing system is configured to select the narrowband switch based on a load of the narrowband switch.

41. The communication system of claim 39 wherein the processing system is configured to select the narrowband switch based on network access to the narrowband switch.

42. The communication system of claim 39 wherein the processing system is configured to select the narrowband switch based on a service area for the narrowband switch.

43. The communication system of claim 39 wherein the processing system is configured to select the narrowband switch based on a network maintenance condition.

44. The communication system of claim 30 wherein the narrowband switch is configured to provide a called number translation service for the call.

45. The communication system of claim 30 wherein the narrowband switch is configured to provide a billing service for the call.

46. The communication system of claim 30 wherein the narrowband switch is configured to provide a validation service for the call.

47. The communication system of claim 30 wherein the narrowband switch is configured to provide a calling card service for the call.

48. The communication system of claim 30 wherein the narrowband switch is configured to provide a voice message service for the call.

49. The communication system of claim 30 wherein the asynchronous communication system comprises an asynchronous transfer mode system and the first identifier comprises an asynchronous transfer mode connection.

50. The communication system of claim 30 wherein the processing system is external to telecommunication switches.

51. The communication system of claim 30 wherein the first message comprises an initial address message.

52. The communication system of claim 30 wherein the processing system is configured to access a service control point to process the first message.

53. The communication system of claim 30 wherein the processing system is configured to process the first message to select a first connection and generate and transfer third and fourth messages identifying the first connection;

the asynchronous communication system is configured to receive the third message, and in response to the third message, route the call communications to the narrowband switch over the first connection; and the narrowband switch is configured to receive the call communications from the first connection and the fourth message and process the fourth message to provide the service for the call.

54. The communication system of claim 53 wherein the narrowband switch is configured to select a route for the call, transfer the call communications over a second connection, and generate and transfer a fifth message identifying the route and the second connection.

55. The communication system of claim 54 further comprising:

the processing system is configured to receive and process the fifth message to select a second identifier based on the route and generate and transfer a sixth message identifying the second identifier and the second connection; and the asynchronous communication system is configured to receive the call communications from the second connection and the sixth message, and in response to the sixth message, insert the second identifier in the call communications and route the call communications.

56. The communication system of claim 55 further comprising:

the processing system is configured to process the sixth message to select a third connection and generate and transfer a seventh message identifying the third connection;

into the asynchronous communication system is configured to receive the seventh message, and in response to the seventh message, route the call communications from the asynchronous communication system over the third connection.

57. The communication system of claim 56 wherein the asynchronous system is configured to convert the call communications from a synchronous format to an asynchronous format in response to the sixth message and convert the call communications from the asynchronous format to the synchronous format in response to the seventh message.

58. The communication system of claim 53 wherein the asynchronous system is configured to convert the call communications from a synchronous format to an asynchronous format in response to the second message and convert the call communications from the asynchronous format to the synchronous format in response to the third message.

* * * * *